United States Patent Office 3,531,468
Patented Sept. 29, 1970

3,531,468
MACROBICYCLIC COMPOUNDS
Chung Ho Park and Howard E. Simmons, Wilmington, Del., assignors to E. I. du Pont de Nemours and Company, Wilmington, Del., a corporation of Delaware
No Drawing. Filed May 1, 1967, Ser. No. 634,903
Int. Cl. C07d 41/00, 53/00
U.S. Cl. 260—239                                     5 Claims

ABSTRACT OF THE DISCLOSURE

Macrobicyclic organic compounds having two nitrogen bridgehead atoms and having chains of 6 or more methylene groups joining the two bridgeheads, exist in two isomeric forms in which the bridgehead links are directed inwardly or outwardly from the cage structure. The compounds can be used as polymerization catalysts, curing agents for vinylidene fluoride polymers, polymer intermediates, and as selective encapsulating agents for anions.

BACKGROUND OF THE INVENTION

Field of the invention

This invention relates to bicyclic organic compounds having two nitrogen bridgehead atoms, separated by chains having a minimum of six methylene groups.

$$N \underset{(CH_2)_n}{\overset{(CH_2)_n}{\underset{\diagdown}{\diagup}}} N$$

I

Description of the prior art

Certain bicyclic organic compounds, containing, within the bicyclic structure, two nonmetallic atoms, and particularly bicyclic diamines, are old. However, all previously known such compounds have had at least one of the three chains forming the bicyclic structure with the two nonmetallic bridgehead atoms of relatively short chain length, i.e., 1–3 carbons, or else were aromatic in character. Among these compounds may be mentioned 1,4-diazabicyclo[2.2.2]octane which is disclosed by O. Hromatka, Ber., 75B, 1302 (1924), 1,4 diazabicyclo-[2.2.3]nonane, which is described by S. M. McElvain and L. W. Bannister, J. Am. Chem. Soc., 76, 1126 (1954); 1,5 diazabicyclo[3.3.3]undecane which is described by J. K. N. Jones et al., Roczniki Chem., 31, 102 (1957); C. A. 51, 14718b. Other compounds containing unsaturated or aromatic bridges are described by Lüttringhaus and Simon, Ann., 557, 120 (1947) and Schill, Ber., 98, 3439 (1965).

The above compounds, which contain either short chain bridges or aromatic structures, are different from the novel compounds in the present case in that they are not capable of the new form of isomersim which has been discovered, and which will be described hereinafter.

SUMMARY OF THE INVENTION

The compounds of the present invention can be described by the structural formula:

$$N \underset{R_3}{\overset{R_1}{\underset{\diagdown}{\diagup}}} R_2 - N$$

wherein $R_1$, $R_2$, and $R_3$, which can be alike or different, are polymethylene diradicals, each of 6 or more methylene units; when the two nitrogen atoms can have an additional substituent joined to each, including H and cations of salt-forming compounds.

The novel compounds of this invention thus have two and only two rings which are joined through bridgehead nitrogen atoms with the bridgehead atoms being separated by three chains each of which is composed of at least 6 and preferably from 7 to no more than 34 methylene groups.

The nitrogen amine bridgehead atoms form salts with acids, lower alkyl halides, etc.

The compounds of the present invention can be made by a variety of processes for the manufacture of large ring compounds as described hereinafter.

In the new class of bicyclic compounds in which the two bridgehead atoms are joined to form the bicyclic structure by three relatively long saturated hydrocarbon chains, the bicyclic compounds in the form of salts exhibit the novel property of having the cationic bridgehead atoms assume two isomeric forms: one in which both bridgehead substituents are "inside" the macrobicyclic structure and the other in which they are "outside" the macrobicyclic structure. To illustrate this isomerization, bicyclic diamines of the structure I can be converted to ammonium salts by addition of an acid $H^+A^-$ to form II which can also exist as the isomeric form III having properties different from II:

$$\overset{H^+A^-}{\longrightarrow} \quad H-N \underset{(CH_2)_n}{\overset{(CH_2)_n}{\underset{\diagdown}{\diagup}}} \overset{A^-}{\underset{+}{N}}-H \quad \longrightarrow \quad \overset{A^-}{\underset{A^-}{\overset{(CH_2)_n}{\underset{(CH_2)_n}{\diagup}}}} \overset{+}{N}-H \quad H-\overset{+}{N}$$

II                              III

For the above to take place, the volume of the cavity within the bicycle must not be less than the sum of the volumes of the bridgehead sustituents; the nitrogen atoms in isomer III must not be less than about 3.5 angstroms apart. The minimum value of $n$ in the above is about 6 for the average number of methylenes separating bridgehead atoms. Larger cavities must be present if the salt-forming cationic groups are large.

The configuration of the bridgehead atoms can be inverted thermally by one linking chain threading itself through the ring formed by the remaining two chains linking the bridgehead atoms.

A third method of inverting the bridgehead atoms is by bimolecular substitution of a substituent attached to the bridgehead atoms.

Because the chains joining the bridge atoms are flexible, each of the two isomeric forms of the novel compounds can exist in a variety of conformations while retaining the characteristic isomerisms associated with the bridge atoms. For this reason, the isomers are referred to as topological isomers.

This invention is further illustrated by the following specific examples which should not, however, be construed as fully delineating the scope of this discovery.

EXAMPLE I 1,10-diazabicyclo[8.8.8]hexacosane $$HN \underset{(CH_2)_8}{\overset{(CH_2)_8}{\underset{\diagdown}{\diagup}}} NH \longrightarrow N-(CH_2)_8-N \longrightarrow N \underset{(CH_2)_8}{\overset{(CH_2)_8}{\underset{\diagdown}{\diagup}}} N$$

$$\underset{O=C-(CH_2)_6-C=O}{\overset{Cl\quad Cl}{\underset{\big|\quad\big|}{}}}$$

(A) 1,10 - diazabicyclo[8.8.8]hexacosane 2,9-dione.— Two solutions containing 12.7 g. (0.05 mole) of 1,10-diazacyclooctadecane in 1.0 l. of benzene and 10.55 g. (0.05 mole) of suberyl chloride in 1.0 l. of benzene were added simultaneously and at the same rate to 2 l. of benzene containing 30 ml. of triethylamine under vigorous stirring over a period of 8 hours. The mixture was stirred for an additional hour and allowed to stand overnight. The precipitate formed was removed by filtration and the filtrate was concentrated under reduced pressure to give 19.5 g. ($\sim$100% of theory) of waxy solid. An infrared spectrum of the product showed a strong amide carbonyl absorption peak at 1645 cm.$^{-1}$. The product was purified further by dissolving in chloroform, washing with acid and base to give a waxy solid, M.P. 95–99°, which still had the same infrared spectrum. A 1-g. sample of the product was recrystallized from ethyl acetate by chilling to give a colorless crystalline solid, 0.5 g., M.P. 104–105° C.

*Analysis.*—Calcd. for $C_{24}H_{44}N_2O_2$ (percent): C, 73.42; H, 11.30; N, 7.14. M.W., 392.6. Found (percent): C, 73.15; H, 11.11; N, 6.94. M.W. 392 (mass spec.).

(B) 1,10-diazabicyclo[8.8.8]hexacosane.—Crude 1,10-diazabicyclo[8.8.8]hexacosane-2,9-dione (46 g., 0.117 mole) was reduced with lithium aluminum hydride (17.8 g., 0.47 mole; 300% excess) in tetrahydrofuran by heating under reflux for 63 hours. To the reaction mixture was slowly added 18 ml. of water, 18 ml. of 15% sodium hydroxide solution and then 54 ml. of water with cooling. The mixture was filtered and the solid was thoroughly washed with tetrahydrofuran and ether. The filtrate was concentrated under reduced pressure to give 40 g. (93% of theory) of crude 1,10-diazabicyclo[8.8.8]-hexacosane, M.P. 97–114° C. The crude product was sublimed at 160–165° C. (0.05 mm.) to give a colorless crystalline solid. This solid was dissolved in ether and the solvent was gradually displaced with absolute ethanol on a steam bath until crystals started to appear. The pure bicyclic diamine was obtained as colorless needles, M.P. 120–121° C. It was virtually insoluble in water, ethanol and acetonitrile but very soluble in hexane, ether, chloroform, etc.

*Analysis.*—Calcd. for $C_{24}H_{48}N_2$ (percent): C, 79.05; H, 13.27; N, 7.68. M.W., 364.64. Found (percent): C, 79.30; H, 13.23; N, 7.73. M.W., 364 (mass spec.), 351 (cryoscopic in benzene).

The macrobicyclic diamine forms two distinct ammonium ions, one with the protons inside and the other with the protons outside the cage. Thus, the crystalline hydrochloride Ia exists only as the isomer with both protons outside the cage, but when placed in water, the isomer Ia is converted to isomer Ib whose ammonium protons now lie inside the cage.

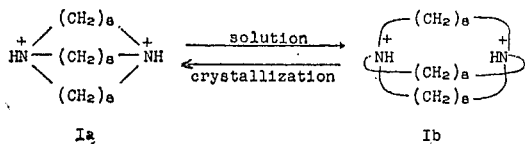

These structures differ topologically as well as chemically, and represent an entirely new kind of isomerism. Study of models shows that hydrogen-hydrogen repulsions in the elongated form Ia are relieved by isomerization to the more spherical form Ib. An NMR (60 mc.) spectrum of Ia in 50% (by volume) trifluoroacetic acid-water solution taken immediately after the solution was made shows two ammonium protons at 1.2τ. When this solution was allowed to stand for three days, a drastically changed spectrum was obtained with the signals for the ammonium protons absent and those of methylene protons, especially of α-methylene protons, sharper. The "inside" ammonium protons at 5.4τ can be observed if they are decoupled by irradiation with the $^{14}$N resonance frequencies.

Characteristic differences observed for the NMR peaks of α-methylene protons of Ia and Ib were utilized in following the rate of the transformation of Ia to Ib.

Authentic mixtures containing different ratios of Ia and Ib were prepared by mixing different amounts of two solutions; one containing Ib (20 mg. of the free amine dissolved in 0.35 ml. of 1.0 N HCl and allowed to stand for five days) and the other containing Ia (20 mg. of crystalline dihydrochloride just dissolved in 35 ml. of 0.1 N HCl). NMR spectra of these mixtures were taken immediately after the samples were prepared (α-methylene proton peaks were traced within one minute from the time solutions containing Ia were prepared).

Crystalline dihydrochloride Ia (20 mg.) was dissolved in different concentrations of acids (0.35 ml.) and their NMR spectra were taken at different time intervals. Time required for the samples to reach certain compositions were determined by comparing their NMR spectra with those of authentic mixtures. This procedure gave a measure of the dependence of the transformation on acid concentration and demonstrated that the rate is inversely proportional to the acid concentration at pH<1 and independent of acid concentration at pH>1.

Alternatively, the isomerization can be monitored more conveniently by following their α-methylene proton resonance peaks in 220 mc. NMR spectra, since the α-methylene protons of the two isomers have two distinct chemical shifts.

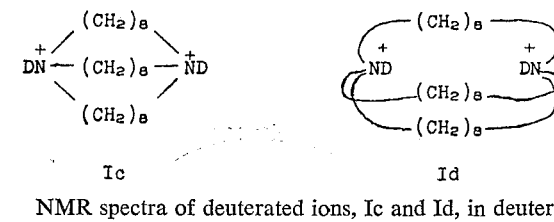

NMR spectra of deuterated ions, Ic and Id, in deuterated solvent (50% deuterated trifluoroacetic acid-heavy water) are different with the α-methylene protons of Id now appearing as a triplet. These two characteristic shapes of α-methylene proton peaks for diprotonated salt Ib and dideuterated Id can be used to observe how fast the inside protons exchange with the solvent deuteriums. Thus, it has been demonstrated that the outside ammonium protons exchange rapidly (within a second) with the solvent deuteriums, whereas the inside ammonium protons take days for complete exchange.

Free bicyclic diamine can be recovered quantitatively if the solutions containing quaternary salts Ia, Ib, Ic, and Id are made basic.

Crystalline dihydrochloride Ia with both ammonium protons outside the cage as shown by NMR was obtained either by dissolving the pure bicyclic diamine in 6 N hydrochloric acid and removing the excess water and acid or by passing dry hydrogen chloride gas into a solution of the diamine in ether. The dihydrochlorides so obtained (M.P. 277–280° C. dec.) were shown to be identical by NMR spectra. The salt was analyzed without further purification.

*Analysis.*—Calcd. for $C_{24}H_{50}N_2Cl_2$ (percent): C, 65.87; H, 11.52; N, 6.40; Cl, 16.21. N.W., 438. Found (percent): C, 65.84; H, 11.54; N, 6.54; Cl, 15.96. N.E., 219.

Bistrifluoroacetic acid salt was prepared by dissolving the pure bicyclic diamine in 50% aqueous trifluoroacetic acid, allowing it to stand overnight and removing the excess acid and water under reduced pressure (0.5 mm.) at room temperature. The resulting waxy solid was extremely hygroscopic, but prior to absorbing water the salt was shown to have both ammonium protons inside the cage by an NMR spectrum. It showed the characteristic α-methylene proton resonance peak of the structure with both ammonium protons inside the cage. When the waxy bistrifluoroacetic acid salt was allowed to stand in the atmosphere, it picked up moisture to form a wet semisolid which then dried into an amorphous white solid. This solid now had the characteristic α-methylene proton resonance peak of the structure with the ammonium protons outside the cage.

*Analysis.*—Calcd. for $C_{28}H_{50}F_6N_2O_4$ (percent): C, 55.74; H, 8.50; N, 4.73; F, 19.23. Found (percent): C, 55.63; H, 8.15; N, 4.96; F, 19.26.

Hydrogen fluoride salt was prepared by dissolving 1 g. of the pure bicyclic diamine in 10 ml. of 10% aqueous hydrofluoric acid. The solution was evaporated to dryness with a stream of nitrogen at room temperature and the resulting solid was pulverized and dried at 40° C. (300 mm.) overnight.

*Analysis.*—Calcd. for $C_{24}H_{52}N_2F_4$ (percent): C, 64.82; H, 11.79; N, 6.30; F, 17.09. Found (percent): C, 64.08; H, 12.56; N, 6.06; F, 18.32.

This bis-bifluoride salt was shown to be an isomer with both ammonium protons inside the cage whether in crystalline state or in solution. NMR spectra of the salt in deuterochloroform and in 50% (by volume) trifluoroacetic acid-water solution taken immediately after the solutions were prepared shows characteristic α-methylene proton resonance peaks of the structure with the ammonium protons inside the cage.

Dimethyl iodide quaternary salt was prepared in the following manner: To the pure 1,10-bicyclo[8.8.8]hexacosane dissolved in methyl iodide was added acetonitrile until the solution just became cloudy. The cloudiness was removed by addition of just enough methyl iodide and the solution was stirred at room temperature for three days. The pale yellowish crystalline precipitate formed was collected on a filter. An NMR spectrum of the product in an acetic acid-$d_4$-heavy water mixture exhibited the methyl proton resonance peak at 7.0τ, a chemical shift suggestive of outside methyl protons.

EXAMPLE II 1,12-diazabicyclo[10.10.10]dotriacontane

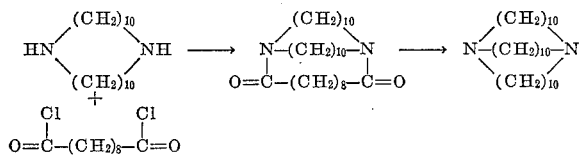

(A) 1,12 - diazabicyclo[10.10.10]dotriacontane - 2,11-dione.—A solution containing 24.85 g. (0.08 mole) of 1,12-diazacyclodocosane in 2.0 l. of benzene and a solution of 19.15 g. (0.08 mole) of sebacoyl chloride in 2.0 l. of benzene were added simultaneously and equivalently to 4.0 l. of benzene containing 48 ml. of trimethylamine with vigorous stirring over a period of six hours. The mixture was allowed to stir overnight, filtered, and the filtrate was concentrated under reduced pressure to give a viscous liquid. An infrared spectrum of the liquid showed a strong carbonyl absorption at 1650 cm.$^{-1}$. It was dissolved in benzene, washed with water, dried over magnesium sulfate, and the solvent was removed under reduced pressure. Final trace of the solvent was removed by heating at 70° C. (0.5 mm.) for two hours to give 34 g. (89% of theory) of 1,12-diazabicyclo[10.10.10] dotriacontane-2,11-dione as a viscous liquid. It was analyzed without further purification.

*Analysis.*—Calcd. for $C_{30}H_{56}N_2O_2$ (percent): C, 75.57; H, 11.84; N, 5.88. Found (percent): C, 74.89; H, 11.72; N, 6.28.

(B) 1,12 - diazabicyclo[10.10.10]dotriacontane.—1,12-diazabicyclo[10.10.10]dotriacontane - 2,11 - dione (31 g., 0.065 mole) was reduced with lithium aluminum hydride (10 g., 0.26 mole; 300% excess) in tetrahydrofuran (400 ml.) as described previously for 1,10-diazabicyclo[8.8.8] hexacosane in Example I above to give 27 g. (92% of theory) of crude 1,12-diazabicyclo[10.10.10]dotriacontane as a waxy solid. The crude product was dissolved in ether and any insoluble particles were removed by filtration. To this solution was added an equal volume of absolute ethanol and heated on a steam bath to remove ether. After cooling, white crystalline solid formed was collected to give 16.5 g., M.P. 113–114° C. A sample, M.P. 114–115° C., obtained by sublimation at 155–160° C. (0.1 mm.) was analyzed.

*Analysis.*—Calcd. for $C_{30}H_{60}N_2$ (percent): C, 80.28; H, 13.43; N, 6.24. M.W., 448.8. Found (percent): C, 79.92; H, 13.41; N, 6.16. M.W., 448 (mass spec.), 475 (cryoscopic in benzene).

An NMR (60 mc.) spectrum of the bicyclic diamine in 50% (by volume) trifluoroacetic acid-water mixture taken immediately after the solution was made showed the α-methylene protons as a broad peak at 2.7–3.3τ and the ammonium protons at 1.3τ. When the same solution was allowed to stand at room temperature for six days, the α-methylene proton signals now became sharper and the peak for the ammonium protons disappeared. The two ammonium protons now could be observed at 5.2τ when the signals were decoupled by irradiation with the $^{14}N$ frequency.

Dimethyl iodide salt was prepared by the same procedure previously described for the dimethyl iodide salt of 1,10-bicyclo[8.8.8]hexacosane. An NMR spectrum of the colorless crystalline methyl iodide salt in acetonitrile-$d_3$-heavy water mixture showed a single methyl proton resonance peak at 7.2τ, a chemical shift suggestive of methyl protons located outside the cage.

EXAMPLE III 1,12-diazabicyclo[10.8.8]octacosane

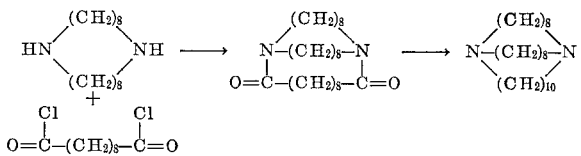

A solution containing 25.5 g. (0.1 mole) of 1,10-diazacyclooctadecane in 2.0 l. of benzene and a solution containing 23.9 g. (0.1 mole) of sebacoyl chloride in 2.0 l. of benzene was added simultaneously and equivalently to 4.0 l. of benzene containing 100 ml. of triethylamine with vigorous stirring over a period of 5.5 hours. After stirring overnight, the reaction mixture was filtered and the filtrate was concentrated under reduced pressure to give 41 g. of viscous liquid which on standing gave solid 1,12-diazabicyclo[10.8.8]octacosane-2,11-dione.

All of the bicyclic diamide obtained above was reduced with lithium aluminum hydride (20 g., 0.5 mole; 400% excess) in 1.0 l. of tetrahydrofuran in a manner similar to those described in Examples I and II, to give 33 g. (85% of theory) of crude 1,12-diazabicyclo[10.8.8]octacosane. An analytical sample of colorless crystalline needles, M.P. 54–55° C., was obtained by sublimation of the crude product at 160° C. (0.1 mm.) followed by recrystallization from absolute ethanol.

*Analysis.*—Calcd. for $C_{26}H_{52}N_2$ (percent): C, 79.52; H, 13.35; N, 7.14. M.W., 392.7. Found (percent): C, 79.80; H, 13.03; N, 7.20. M.W., 392 (mass spec.).

1,12-diazabicyclo[10.8.8]octacosane also exhibits topological isomerism similar to those described earlier for other macrobicyclic diamines as shown by NMR.

EXAMPLE IV 1,9-diazabicyclo[7.7.7]tricosane

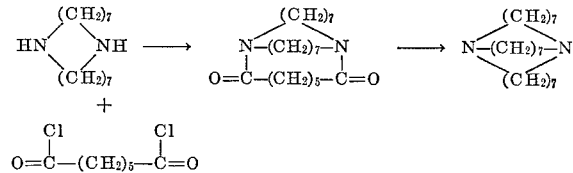

When the general procedure of Examples I–III was repeated except that pimelyl dichloride and 1,9-diazacyclohexadecane was used, there was obtained after reduction 1,9-diazabicyclo[7.7.7]tricosane as a low melting wax, B.P. 187° C. (0.09 mm.). The latter was converted to the dihydrochloride as described in Example I.

EXAMPLE V

1,12-diazabicyclo[10.8.6]hexacosane

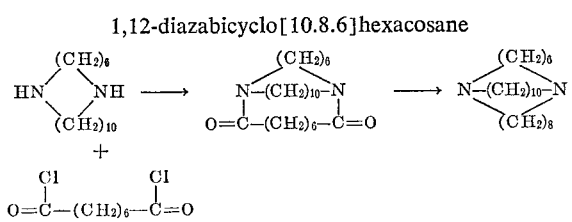

The general procedure of Example I was repeated with suberyl dichloride and 1,8-diazacyclooctadecane as the reactants. The final product was 1,12-diazabicyclo[10.8.6]hexacosane obtained as a viscous liquid purified by molecular distillation at 160° C. at 0.06 mm. It was also converted to the dihydrochloride.

EXAMPLE VI

1,11-diazabicyclo[9.9.9]nonacosane

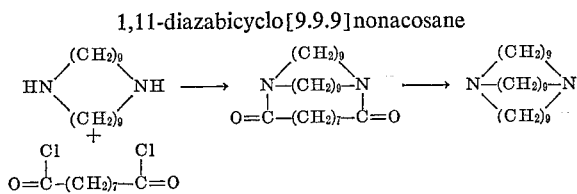

The general procedure of Example I was repeated with 1,11-diazacycloeicosane and azelaoyl dichloride as reactants to give, after reduction, 1,11-diazabicyclo[9.9.9]nonacosane as a viscous liquid boiling at 175° C. at 0.0002 mm. This was also converted to the dihydrochloride.

EXAMPLE VII

1,10-diazabicyclo[8.6.6]docosane

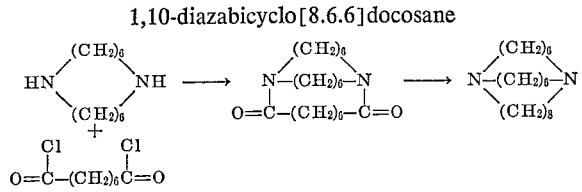

The general procedure of Example I was repeated with 1,8-diazacyclotetradecane and suberyl dichloride as the reactants to give, after reduction, 1,10-diazabicyclo[8.6.6]docosane as a waxy solid which was sublimed at 170° C. at 0.08 mm.

EXAMPLE VIII

1,14-diazabicyclo[12.12.12]octatriacontane

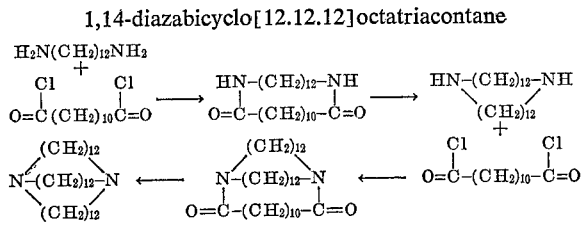

(A) 1,14-diazacyclohexacosane-2,13-dione.—To 4 l. of benzene were added simultaneously and equivalently two solutions: the first of 58.8 g. of dodecanedioylchloride (prepared from reaction of 150 g. of thionyl chloride with 100 g. of dodecanedioic acid followed by distillation at 169–172° C. at 1 mm.) in 2 l. of benzene and the second of 80 g. of 1,12-dodecamethylenediamine in 2 l. of benzene. (The latter compound was obtained from the reaction of 1,10-decamethylene dibromide with potassium cyanide followed by reduction with Raney cobalt catalyst.) The mixture was allowed to stand overnight and the resulting precipitate filtered off, washed with fresh benzene, dried and pulverized (80 g.). The benzene filtrate was evaporated to dryness and the resulting solid added to the precipitate obtained initially. The total solid (142 g.) was extracted with refluxing benzene (1500 ml.) over a period of 5 days. The resulting solid weighed 37 g., M.P. 161–168° C. (47%) from which a small quantity was recrystallized from dimethylformamide, M.P. 171° C.

(B) 1,14-diazacyclohexacosane.—To a slurry containing 19 g. lithium aluminum hydride in 800 ml. of dry tetrahydrofuran was added 37 g. of 1,14-diazacyclohexacosane-2,13-dione in small portions under nitrogen. The mixture was heated under reflux with stirring for 54 hours and worked up by adding slowly 19 ml. of water, 19 ml. of 15% sodium hydroxide solution, and 57 ml. of water with stirring. The solid was filtered off, washed with tetrahydrofuran to yield 22 g. of white waxy solid. The solid was extracted further with tetrahydrofuran to yield another 2 g. An infrared spectrum of the combined solid showed about 5% remaining carbonyl. The reduction was repeated using 5 g. lithium aluminum hydride in 250 ml. tetrahydrofuran to yield 15.5 g. (43%) of 1,14-diazacyclohexacosane, melting at 44–46° C.

(C) 1,14-diazabicyclo[12.12.12]octatriacontane - 2,13-dione.—Two solutions containing 14 g. (0.038 mole) of 1,14-diazacyclohexacosane in 1.0 l. of benzene and 10.2 g. of dodecanedioyl chloride in 1 l. of benzene were added simultaneously and at the same rate to 2 l. of benzene containing 30 ml. triethylamine with vigorous stirring over a period of 24 hours. The mixture was then filtered and concentrated under reduced pressure. The resulting brown oil was dissolved in ether and washed three times with 200 ml. of water and 200 ml. of saturated sodium chloride solution. The ethereal solution was dried over anhydrous magnesium sulfate and concentrated to a brown viscous liquid, 21 g. (96.5%).

(D) 1,14-diazabicyclo[12.12.12]octatriacontane.—Lithium aluminum hydride (4.19 g.) was added to 250 ml. of dry tetrahydrofuran with stirring and 18 g. of 1,14-diazabicyclo[12.12.12]octatriacontane - 2,13 - dione was added slowly under a stream of nitrogen. The mixture was refluxed with stirring for 30 hours. To the reaction mixture was added 4.2 ml. of water, 4.2 ml. of 15% sodium hydroxide solution, and 13 ml. of water. The cake was filtered off, washed twice with 200 ml. of ether, and the filtrate and washings concentrated under reduced pressure. The residual waxy solid (10 g.) was sublimed at 125° C. at 0.15 mm. The sublimed solid was dissolved in ether and the solvent gradually displaced with absolute ethanol on a steam bath until crystals appeared to give 2.5 g. of pure 1,14-diazabicyclo[12.12.12]octatriacontane, melting at 124–126° C.

The macrobicyclic diamines of this invention have a volume of cavity enclosed greater than the volume of all bridgehead substituents. They are readily available from α,ω-diacids which have at least six methylene groups separating the carboxylic groups, e.g., by reaction of the corresponding α,ω-acid dihalides with ammonia to give the α,ω-diamide. The latter is reduced to give the α,ω-diamine. Reaction of the latter with further α,ω-acid dihalide under conditions of high dilution (low concentration of reactants) gives the cyclic α,ω-diamide, i.e.,

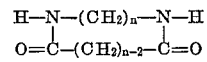

The latter is reduced again to give the cyclic diimine (diazacycloalkane). As described in the preceding examples, reaction in dilute solutions of the monocyclic diimine with further α,ω-acid dihalide then gives the bicyclic diamide which upon reduction yields the bicyclic compound fused through nitrogen and which are hydrocarbon except for the nitrogen, i.e.,

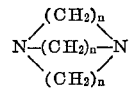

By use of different dibasic acid dihalides, the value of $n$ in the latter formula can be varied in wide limits, e.g., from 6 up to 34 or higher, and for each molecule, the value of $n$ is not necessarily the same.

Examples of further macrobicyclic diamines obtainable as described above include the following:

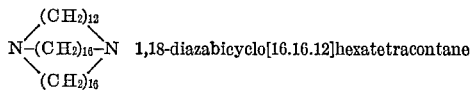
1,18-diazabicyclo[16.16.12]hexatetracontane

[obtained by reaction of 1,12-dodecanediamine with the diacid chloride of thapsic acid [ClOC(CH$_2$)$_{14}$COCl] in two stages]

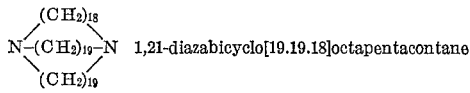
1,21-diazabicyclo[19.19.18]octapentacontane

[obtained by reaction of 1,18-octadecanediamine with the diacid chloride of $\alpha,\omega$-nonadecanedioic acid in the two-stage reaction described]

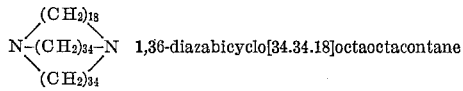
1,36-diazabicyclo[34.34.18]octaoctacontane

[obtained by the reaction of 1,18-octadecanediamine with the diacid chloride of $\alpha,\omega$-tetratriacontanedioic acid in two stages]

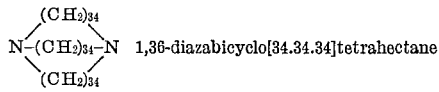
1,36-diazabicyclo[34.34.34]tetrahectane

[obtained by reaction of the diacid chloride of $\alpha,\omega$-tetratriacontanedioic acid with ammonia followed by reduction to give 1,34-tetratriacontanediamine which is then reacted in two stages with the diacid chloride of $\alpha,\omega$-dotriacontanedioic acid].

By such a series of reactions from available diamines and diacids, $n$ in the preceding formula is preferably from 6–34 since acids of the formula HOOC(CH$_2$)$_x$COOH where $x$=6, 7, 8, 9, 10, 11, 12, 13, 14, 15, 16, 17, 18, 19, 20, 21, 22, 24, 28, and 32 have been adequately described in the chemical literature. Others are available by procedures known in the art.

The amines of the present invention form ammonium compounds which are capable of encapsulating anions. In these complexes the compounds are in the "inner" form with the hydrogen atoms directed towards the center of the cavity within the bicyclic structure. The anions are held in part by electrostatic forces and in part by hydrogen bonding. Because the anions must fit within the cavity, the formation of the novel complexes and their stability depends on the size of the bicyclic compound, and the size and nature of the anions. For this reason the ammonium salts of the novel bicyclic compounds are useful as selective sequestering agents in analytical chemistry.

The approximate cavity size of ammonium compounds wherein the nitrogen atoms are joined by three chains each containing $n$ methylene groups has been calculated as follows:

| $n$ | Approximate cavity diameter, A. | Halide ions encapsulatable |
| --- | --- | --- |
| 7 | 2.4 | |
| 8 | 2.8 | F-. |
| 9 | 3.6 | F-, Cl- (Br-). |
| 10 | 4.8 | F-, Cl-, Br-, and I-. |
| 12 | 6.0 | F-, Cl-, Br-, and I-. |

Other inorganic anions such as CN-, N$_3$-, SO$_4$=, SO$_3$=, OCl- and organic anions such as CH$_3$CO$_2$-, CF$_3$CO$_2$- and the like will also be encapsulated by suitably large bicyclic ammonium compounds.

In many instances, the compounds containing encapsulated anions are sufficiently stable to be isolated in the solid state as compounds distinct from solid salts of the "outer" isomeric form. The preparation of solid 1,11-diazabicyclo[9.9.9]nonacosane dihydrochloride in the two isomeric forces is described by the following examples A and B.

EXAMPLE A 1,11-diazabicyclo[9.9.9]nonacosane dihydrochloride (with the dihydrochloride outside the cage)

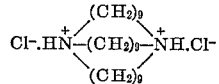

Two grams of 1,11-diazabicyclo[9.9.9]nonacosane was dissolved in a solution of 20 ml. of 2 N hydrochloric acid and 30 ml. of ethanol by warming. After being stirred at room temperature overnight, the mixture was concentrated to dryness under reduced pressure on a steam bath. The resulting wet solid was dissolved in 10 ml. of hot ethanol and the solvent was again removed under reduced pressure. This ethanol treatment was repeated twice to give a colorless solid which could be recrystallized from an ethanol-water mixture. The product was shown to possess both hydrochlorides outside the cage by 220 mc. NMR spectra.

*Analysis.*—Calcd. for C$_{27}$H$_{56}$N$_2$Cl$_2$ (percent): C, 67.61; H, 11.77; N, 5.84; Cl, 14.78. Found (percent): C, 67.33; H, 11.83; N, 5.65; Cl, 14.44.

EXAMPLE B 1,11-diazabicyclo[9.9.9]nonacosane dihydrochloride (with two protons and a chloride ion within the cage)

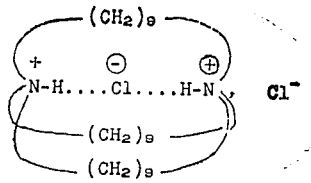

Two grams of 1,11-diazabicyclo[9.9.9]nonacosane was dissolved in 25 ml. of 50% trifluoroacetic acid-water solution. To this solution was added 1 ml. of 12 M hydrochloric acid and 1.25 g. of lithium chloride and the mixture was heated at about 65° C. for 1 hour. The solvent was then removed under reduced pressure on a steam bath and the resulting semisolid was triturated in cold 10% hydrochloric acid to give white solid precipitate. The solid was filtered, washed thoroughly with 10% hydrochloric acid and dried in a stream of nitrogen to give 2 g. of colorless solid which was shown to be homogeneous and contain two protons and one chloride ion inside the cage by 220 mc. NMR spectra.

The use of the ammonium bicyclic compounds as encapsulating agents does not, however, depend on isolation of compounds containing the encapsulated ammonium as shown in Example C.

EXAMPLE C 4 g. of 1,11-diazabicyclo[9.9.9]nonacosane is added to a solution of 0.8 g. of potassium chloride and 1.2 g. of potassium bromide in 0.1 M acetic acid. After heating for 1 hour at 65° C. the free chloride in the solution was reduced by 20% whereas the free bromide ion content was unaltered.

The compounds of the present invention are useful as curing agents for polymers of vinylidene fluoride, particularly elastomeric copolymers of vinylidene fluoride such as vinylidene fluoride/hexafluoropropylene copolymers. A typical curing formulation is as follows.

A masterbatch is formed of the following:

Parts by weight
Vinylidene fluoride/hexafluoropropylene copolymers _____ 100
M.T. black _____ 20
Magnesium oxide _____ 15

55 parts of the above masterbatch were compounded with 2 parts of 1,10-diazabicyclo[8.8.8]hexacosane, and pressed to a sheet. At 500 lb. pressure, 160° C. little or no cure was obtained. On increasing the temperature to 200° C. a cure was obtained. The sheet was then post cured for 24 hours at 204° C.

The new compounds of this invention are useful as catalysts in the preparation of urethane polymers when incorporated at the rate of 0.001 to 0.1% or more with polyisocyanate such as p-phenylenediisocyanate and a polyglycol such as hexamethylenediol to form a polyurethane. They are also useful as acid acceptors and as complexing agents for metals. The bicyclic diamines are particularly useful for the latter and can also be used in the preparation of polymers containing a plurality of bicyclic rings. For example, reaction of a diamine, such as 1,10 diazabicyclo[8.8.8]hexacosane with allyl bromide gives the diallylic salt which can be polymerized by addition polymerization to polymer as shown in the equation:

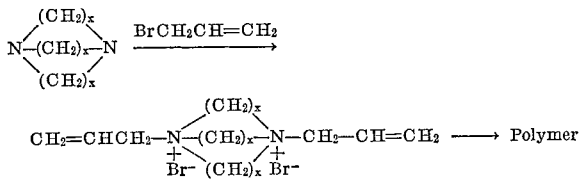

The amines are useful for making complexes with such metals as Co, Cd, Cu and Fe. For instance, 1,10-diazabicyclo[8.8.8]hexacosane forms one-to-one coordination polymers with $CoCl_2$. The amine dihydrochlorides are surface-tension depressants. The effectiveness of 1,10-diazabicyclo[8.8.8]hexacosane dihydrochloride as surface depressant is demonstrated by measuring the heights of rise of liquid in a capillary tube. At 25° C., distilled water rose to a height of 13.2 cm.; however, at the same temperature and with the same apparatus, an aqueous solution consisting only of water and 1% by weight of the said salt, rose to a height of 9.0 cm. thus showing that these salts significantly reduced surface tension.

We claim:
1. Composition having the formula

wherein $R_1$, $R_2$, and $R_3$ are polymethylene diradicals containing from 6 to 34 methylene units.

2. The composition of claim 1 wherein $R_1$, $R_2$ and $R_3$ are each octamethylene diradicals.

3. The composition of claim 1 wherein $R_1$, $R_2$ and $R_3$ are each nonamethylene diradicals.

4. The composition of claim 1 wherein $R_1$, $R_2$ and $R_3$ are each decamethylene diradicals.

5. A salt of a compound having the formula

wherein $R_1$, $R_2$ and $R_3$ are polymethylene diradicals containing from 6 to 34 methylene units with an acid.

References Cited

Jones: Chem. Abstracts, vol. 51, col. 14718 (1957).

ALTON D. ROLLINS, Primary Examiner

U.S. Cl. X.R.

252—182, 357; 260—77.5, 88.3, 92.1, 239.3